Dec. 20, 1966  G. H. SMERAGE  3,293,485
POLAR DISPLAY APPARATUS USING HALL MULTIPLIER
Filed Dec. 11, 1963  2 Sheets-Sheet 1
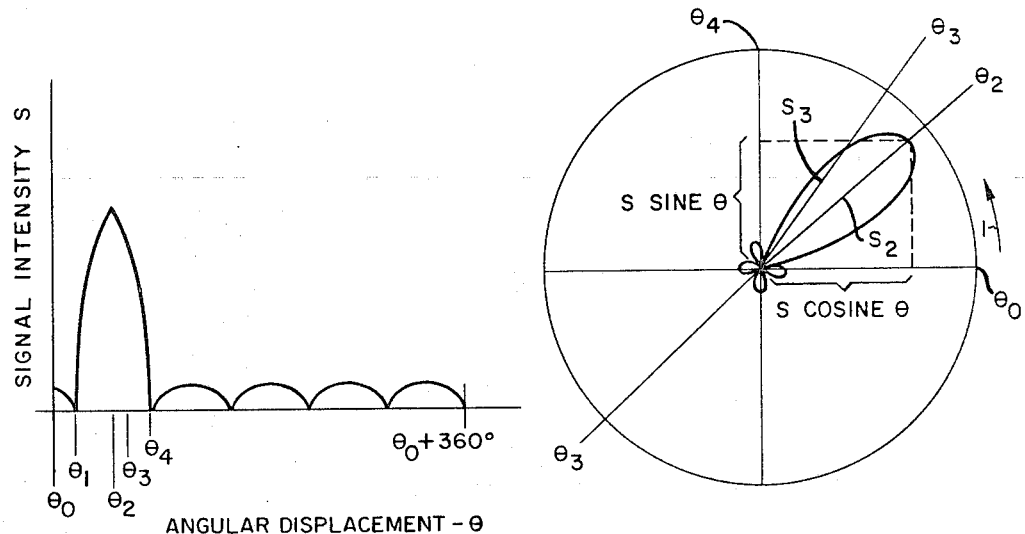
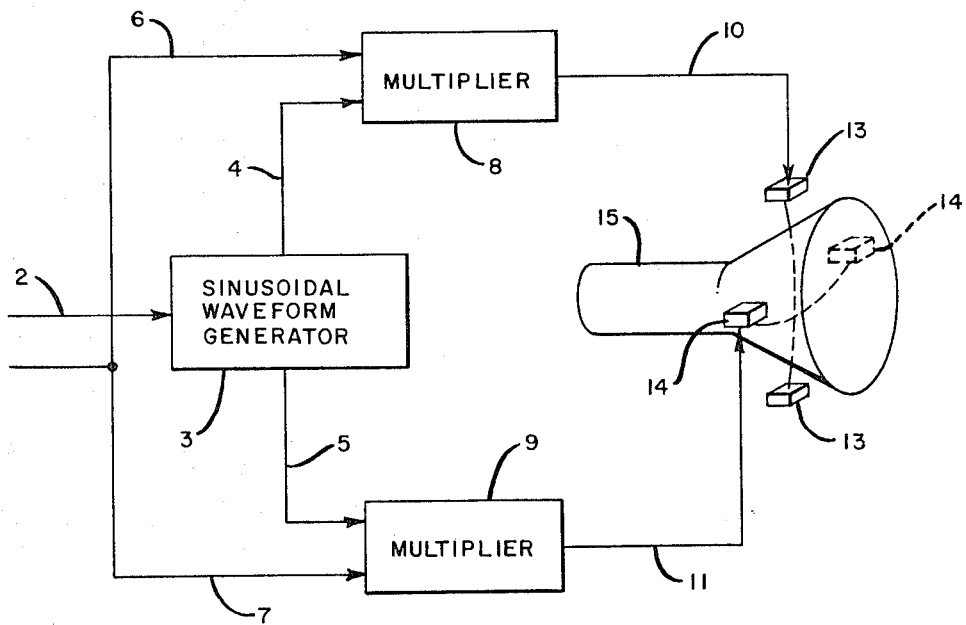
INVENTOR.
GLEN H. SMERAGE
BY *John F. Lawler*
ATTORNEY

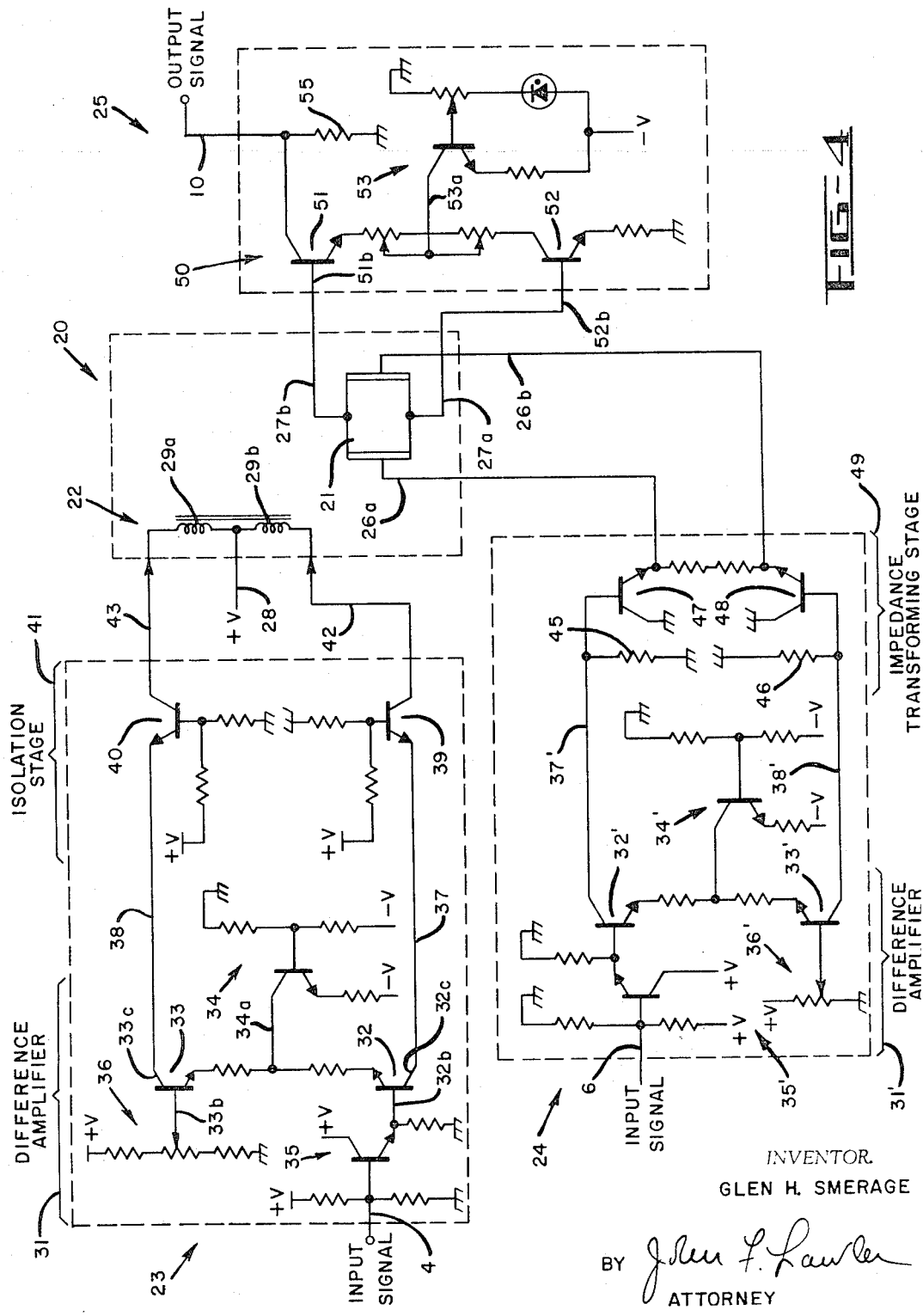

United States Patent Office 3,293,485
Patented Dec. 20, 1966

3,293,485
POLAR DISPLAY APPARATUS USING
HALL MULTIPLIER
Glen H. Smerage, Mountain View, Calif., assignor to
Sylvania Electric Products Inc., a corporation of Delaware
Filed Dec. 11, 1963, Ser. No. 329,793
1 Claim. (Cl. 315—23)

This invention relates to polar display techniques and more particularly to an electronic polar display system employing a conventional cathode ray tube.

The objects of this invention are to provide an improved polar display system adapted for use with a scanning system having a mechanically or electrically rotating antenna; to provide a polar display system having a minimum number of moving parts; and to provide a polar display system that is relatively low in cost, easy to construct and reliable in operation.

In direct finding systems, an antenna is rotated mechanically or electrically to scan an area for electromagnetic signals. The received signals are vector quantities which are related to the angular displacement of the scanning antenna. The signals are maximum when the scanning antenna is directly "in line" with the radiator of the source of electromagnetic signals. The magnitude of received signals decreases as the scanning antenna is rotated from the "in line" position.

In accordance with this invention, a polar display showing the location and relative magnitude of the received signal is obtained on a conventional cathode ray tube by generating signals corresponding to the rectangular coordinates which make up the received signal vector. Accurate electrical analogs of the rectangular coordinates are obtained by use of Hall multipliers for linearly multiplying the received signal by sinusoidal signals that vary as a function of the sine and cosine, respectively, of the angular displacement of the scanning antenna. Signals proportional to these products are applied to the horizontal and vertical deflection systems of the cathode ray tube and a polar trace similar to an antenna pattern is produced.

This invention and its objects will be more fully understood from the following description of an embodiment thereof, reference being had to the following drawings in which:

FIGURE 1 is a rectilinear plot of the magnitude S of the received signal as a function of the angular displacement $\theta$ of the scanning antenna;

FIGURE 2 is a polar plot of the signals of FIGURE 1 and corresponds to the trace displayed by the readout cathode ray tube;

FIGURE 3 is a block diagram of a polar display system embodying this invention; and FIGURE 4 is a schematic representation of the multipliers of FIGURE 3.

A better understanding of the invention will be had by initially considering the variation of signals received by a direction finding system and represented by the rectilinear and polar displays of FIGURES 1 and 2, respectively. The magnitude of the received signal is designated S and varies as a function of the angular displacement $\theta$ as shown in FIGURE 1. The position or angular displacement $\theta$ of the scanning antenna is referenced to a fixed reference line at $\theta_0$. The received signal is maximum at the angular displacement $\theta_2$, when the electrical axis of the scanning antenna is directed at the radiator of signals. Assuming the position of the radiator is fixed, the magnitude S of the received signal decreases as the scanning antenna is rotated away from the radiator. The signal intensity decreases to zero at the displacement angles $\theta_1$ and $\theta_4$. The minor signal variations indicated between $\theta_4$ and $\theta_1$ are caused by the back lobes of the scanning antenna.

As shown in the polar plot in FIGURE 2, the signal intensity S is maximum at the displacement angle $\theta_2$. The maximum signal intensity $S_2$ is comprised of a horizontal component $S_2$ cosine $\theta_2$ and a vertical component $S_2$ sine $\theta$. The magnitude of the received signal and its horizontal and vertical components change as the scanning antenna is rotated. By way of example, when the scanning antenna is rotated from the displacement angle $\theta_2$ to the displacement angle $\theta_3$ the signal intensity decreases from $S_2$ to $S_3$. The horizontal and vertical components comprising the signal $S_3$ are $S_3$ cosine $\theta_3$ and $S_3$ sine $\theta_3$, respectively.

The improved polar display system embodying this invention is shown in FIGURE 3 and comprises a sinusoidal waveform generator 3, multipliers 8 and 9, and a cathode ray tube 15 having an associated vertical deflection system 13 and horizontal deflection system 14. An electrical angular displacement signal, which is a function of the angular displacement of a scanning antenna, is obtained directly from the drive of an electrically driven scanning antenna or from an electromechanical transducer in a system having a mechanically driven scanning antenna. The angular displacement signal is applied on line 2 to sinusoidal waveform generator 3. Sinusoidal signals, which are 90 degrees out of phase with each other, and varying as a function of the angular displacement $\theta$, are applied on lines 4 and 5 to multipliers 8 and 9, respectively. The received signal is applied to the multipliers 8 and 9 on lines 6 and 7, respectively. The outputs of the multipliers 8 and 9 are applied on lines 10 and 11 to the vertical and horizontal deflection systems 13 and 14, respectively, of the cathode ray tube 15. Deflection systems associated with a cathode ray tube employing electromagnetic deflection comprise deflection coils and an amplifier having an output current. Similarly, deflection systems associated with a cathode ray tube employing electrostatic deflection comprise deflection plates and an amplifier having an output voltage.

The sinusoidal waveform generator 3, which is responsive to the angular displacement signal, produces on lines 4 and 5 a first sinusoidal output which is proportional to the sine of the displacement angle and a second sinusoidal output which is proportional to the cosine of the angular displacement, $k$ sine $\theta$ and $k$ cosine $\theta$, respectively, where $k$ is a proportionality constant. Multipliers 8 and 9 multiply the first and second sinusoidal signals by the received signal to produce a first product signal $s$ sine $\theta$ and a second product signal $s$ cosine $\theta$, respectively, where $s$ is proportional to $Sk$. The first and second product signals are applied to the vertical and horizontal deflection systems 13 and 14 to produce the polar display of FIGURE 2 on the face of the cathode ray tube 15.

In accordance with this invention, the multipliers 8 and 9 comprise Hall multipliers. Hall multipliers are solid state devices which directly multiply the sinusoidally varying angular displacement signals and received signals to provide a linear product output and an accurate polar display.

A detailed diagram of a preferred circuit embodying the invention is illustrated in FIGURE 4. As the multipliers 8 and 9 are preferably identical, a description of only one multiplier will be given. Multiplier 8 comprises a Hall multiplier 20 having a Hall element 21 and a magnetic circuit 22; a coil drive amplifier 23; a Hall element drive amplifier 24 and a read amplifier 25. Hall multipliers are described in "Analog Multiplier Based on the Hall Effect" by Lars Löfgren, Journal of Applied Physics, Volume 29, No. 2, February 1958, pages 158–

166. The Hall element 21 is a very thin slab semiconductor crystal. Input leads 26a and 26b, respectively, are connected to one pair of opposite sides of crystal 21 at points lying in the plane of the crystal. Output leads 27a and 27b are similarly connected to the other pair of opposite sides of the crystal at points lying in the same plane. Magnetic circuit 22 comprises a coil wound on an iron core and having a center tap 28 defining coil windings 29a and 29b. Center tap 28 is connected to a positive supply potential. The magnetic circuit is positioned to develop a magnetic field perpendicular to the plane of the semiconductor crystal and the connection thereto of leads 26a, 26b, 27a and 27b.

Coil drive amplifier 23 comprises a difference amplifier 31 having the emitters of transistors 32 and 33 connected on line 34a to a constant current source 34. A sinusoidal input signal on line 4 is applied through an isolation amplifier 35 to base 32b of transistor 32. Isolation amplifier 35 converts the low input impedance of transistor 32 to a high impedance so that the transistor will not load the source of sinusoidal signals connected to line 4. Base 33b is connected to a variable voltage divider network 36 for balancing the difference amplifier 31 when no signal is applied on line 4. The output signal current produced by difference amplifier 31 is coupled on lines 37 and 38 from collectors 32c and 33c, through transistors 39 and 40 of an isolation stage 41, and is applied on lines 42 and 43 to coils 29a and 29b of magnetic circuit 22, respectively. Isolation stage 41 prevents feedback of the voltage developed in the coils from affecting the operation of the difference amplifier.

The Hall element drive amplifier 24 is similar to coil drive amplifier 23 and like reference characters refer to like elements on the drawings. The output signal current of difference amplifier 31′ on lines 37′ and 38′ is converted to an output signal voltage by load impedances 45 and 46. The output signal voltage is applied through transistors 47 and 48 of emitter follower impedance matching stage 49 to the input leads 26a and 26b, respectively, of the Hall element 21. Emitter follower 49 transforms the load impedances 45 and 46 to a low output impedance across the Hall element 21.

Read amplifier 25 comprises difference amplifier 50 having the emitters of transistors 51 and 52 connected on line 53a to a constant current source 53. The output of the Hall element 21 on lines 27a and 27b is applied to bases 51b and 52b, respectively, of difference amplifier 50. An amplified output signal voltage is developed on line 10 across a load impedance 55.

The operation of the multiplier will be more fully understood by tracing signals through the circuits. The first sinusoidal signal $k$ sine $\theta$ is applied on line 4 to coil drive amplifier 23. A sinusoidal varying current is produced by difference amplifier 31 and applied on lines 42 and 43 to coils 29a and 29b of magnetic circuit 22. The coils produce a magnetic field which is proportional to the sinusoidally varying current and is perpendicular to the plane including the Hall element 21 and the input leads 26a and 26b and output leads 27a and 27b.

The received signal is applied on line 6 to Hall element drive amplifier 24. An amplified signal current is produced by difference amplifier 31′ and is converted to a signal voltage by load impedances 45 and 46. The signal voltage is applied on lines 26a and 26b to Hall element 21 to produce a current $S_i$ therein between the input lines. The current $S_i$ in the Hall element is perpendicular to the sinusoidally varying magnetic field produced by the magnetic circuit 22.

The Hall multiplier 20 produces a first Hall voltage product signal on lines 27a and 27b which is proportional to the product of the received signal and the sine of angular displacement. The first product signal on lines 27a and 27b is $$V_H = K\{S_i\}\{k' \text{ sine } \theta\}$$

where $V_H$ is the Hall voltage, K is a constant of proportionality, $S_i$ is the current produced in the Hall element by the received signal and $k'$ sine $\theta$ is proportional to the current produced in the magnetic circuit coils 29a and 29b by the angular displacement signal. The Hall voltage is amplified by difference amplifier 50 and is applied to the display tube 15.

The amplified first product signal is coupled from multiplier 8 (see FIGURE 3) on output line 10. The amplified second product signal is coupled from multiplier 9 on output line 11.

Although this invention has been illustrated and described with reference to a preferred embodiment thereof it is to be understood that the scope of the invention is not limited thereto, but is determined by the scope of the appended claim.

What is claimed is:

In a radio frequency direction finding system, apparatus providing a polar display of an incident radio frequency signal which is received by a rotating antenna and has a magnitude which is a function of the angular displacement of rotating antenna, said apparatus comprising a sinusoidal waveform generator, means for applying an angular displacement signal which is proportional to the angular displacement of the rotating antenna to said sinusoidal waveform generator, said generator providing a first sinusoidal output which is a function of the sine of the angle of displacement of the rotating antenna and a second sinusoidal output which is a function of the cosin of the angle of displacement of the rotating antenna, a signal amplifier responsive to the incident signal received by the rotating antenna for generating a signal voltage, a first amplifier responsive to the first sinusoidal output for generating a first current output which is proportional to the sine of the angle of displacement of the rotating antenna, a second amplifier responsive to the second sinusoidal output for generating a second current output which is proportional to the cosine of the angle of displacement of the rotating antenna, a first Hall multiplier having a first magnetic circuit responsive to the first current output of said first amplifier for generating a sinusoidally varying magnetic field proportional to the angle of displacement of the rotating antenna, and a first Hall semiconductor element responsive to the signal voltage of said signal amplifier for generating a signal current in said element proportional to the magnitude of the incident signal received by the rotating antenna, said first Hall semiconductor element producing a first Hall voltage product output proportional to the product of the incident signal received by the rotating antenna and the sine of the angle of displacement of the rotating antenna, a second Hall multiplier having a second magnetic circuit responsive to the second current output of said second amplifier for generating a sinusoidally varying magnetic field proportional to the angle of displacement of the rotating antenna, and a second Hall semiconductor element responsive to the signal voltage of said signal amplifier for generating a signal current in said element proportional to the magnitude of the incident signal received by the rotating antenna, said second Hall semiconductor element producing a second Hall voltage product output proportional to the product of the incident signal received by the rotating antenna and the cosine of the angular displacement of the rotating antenna, and
a cathode ray tube having
 a vertical deflection system responsive to the first Hall voltage product output, and
 a horizontal deflection system responsive to the second Hall voltage product output whereby to provide a polar display of the incident signal received by the rotating antenna.

References Cited by the Examiner

UNITED STATES PATENTS 3,121,788  2/1964  Hilbinger _____ 307—88.5
3,175,121  3/1965  Birnbaum _____ 315—23

DAVID G. REDINBAUGH, *Primary Examiner.*

T. A. GALLAGHER, *Assistant Examiner.*